United States Patent
Hilzendegen et al.

(10) Patent No.: US 10,801,638 B2
(45) Date of Patent: Oct. 13, 2020

(54) VALVE, IN PARTICULAR A 4/2-WAY SLIDE VALVE

(71) Applicant: HYDAC FLUIDTECHNIK GMBH, Sulzbach/Saar (DE)

(72) Inventors: Philipp Hilzendegen, Wadern (DE); Peter Bruck, Althornbach (DE); Martin Grill, St. Wendel (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 112 days.

(21) Appl. No.: 16/064,057

(22) PCT Filed: Dec. 21, 2016

(86) PCT No.: PCT/EP2016/002149
§ 371 (c)(1),
(2) Date: Jun. 20, 2018

(87) PCT Pub. No.: WO2017/108183
PCT Pub. Date: Jun. 29, 2017

(65) Prior Publication Data
US 2018/0299025 A1    Oct. 18, 2018

(30) Foreign Application Priority Data
Dec. 23, 2015 (DE) ........................ 10 2015 016 846

(51) Int. Cl.
*F16K 11/07* (2006.01)
*F15B 13/04* (2006.01)
(Continued)

(52) U.S. Cl.
CPC ........ *F16K 31/0613* (2013.01); *F15B 13/025* (2013.01); *F15B 13/0402* (2013.01);
(Continued)

(58) Field of Classification Search
CPC ............ F16K 31/0613; F16K 11/0716; F16K 27/041; F16K 27/048; F15B 13/025;
(Continued)

(56) References Cited

U.S. PATENT DOCUMENTS 2,547,254 A * 4/1951 Braithwaite ............ F15B 13/06
137/625.17
2,910,089 A * 10/1959 Yarber ................ F16K 31/0613
137/625.65
(Continued)

FOREIGN PATENT DOCUMENTS

DE         42 27 767      3/1994
DE     20 2012 009 838    12/2013
(Continued)

OTHER PUBLICATIONS

International Search Report (ISR) dated Mar. 16, 2017 in International (PCT) Application No. PCT/EP2016/002149.

Primary Examiner — Kelsey E Cary
(74) Attorney, Agent, or Firm — Wenderoth, Lind & Ponack, L.L.P.

(57) ABSTRACT

A valve, in particular a 4/2-way slide valve (60), includes a valve piston (67), which is guided in a longitudinally movable manner in a valve housing (25), for selectively connecting and disconnecting fluid connections in the valve housing (25), such as a pressure supply connection (P), a tank connection (T), and two utility connections (A, B). A magnetic system (49), to which current can be supplied, controls the valve piston (67). When no current is supplied to the magnetic system (49), the control pressure at one of the utility connections (A, B) can be set, in particular limited, by a control device (62, 70, 79, 80, 88) arranged in the valve housing.

21 Claims, 5 Drawing Sheets

(51) Int. Cl.
*F16K 31/06* (2006.01)
*F15B 13/02* (2006.01)
*F15B 13/044* (2006.01)
*F16K 11/00* (2006.01)
*F16K 27/04* (2006.01)
*G05D 16/20* (2006.01)
*F15B 13/00* (2006.01)

(52) U.S. Cl.
CPC ............ *F15B 13/044* (2013.01); *F16K 11/00* (2013.01); *F16K 11/0716* (2013.01); *F16K 27/041* (2013.01); *F16K 27/048* (2013.01); *G05D 16/2024* (2019.01); *F15B 2013/004* (2013.01); *F15B 2013/041* (2013.01); *F15B 2013/0448* (2013.01); *F15B 2211/30525* (2013.01); *F15B 2211/327* (2013.01); *F15B 2211/50554* (2013.01)

(58) Field of Classification Search
CPC ................ F15B 13/0402; F15B 13/044; F15B 2013/044; F15B 2013/0448; F15B 2013/041; F15B 2211/50554; F15B 2211/327; F15B 2211/30525; Y10T 137/86614; Y10T 137/86702; G05D 16/2024
See application file for complete search history.

(56) References Cited

U.S. PATENT DOCUMENTS

| | | | | |
|---|---|---|---|---|
| 4,768,339 | A * | 9/1988 | Aoyagi | F15B 21/087 60/427 |
| 5,076,537 | A * | 12/1991 | Mears, Jr. | F15B 13/0402 137/625.65 |
| 6,289,921 | B1 * | 9/2001 | Neuhaus | F15B 13/044 137/454.5 |
| 2004/0256012 | A1 * | 12/2004 | Bruck | G05D 16/2024 137/625.65 |
| 2012/0012773 | A1 * | 1/2012 | Fischer | F16K 11/0716 251/321 |
| 2012/0048400 | A1 * | 3/2012 | Schudt | F15B 13/0442 137/528 |
| 2015/0000774 | A1 * | 1/2015 | Sung | F16K 11/0708 137/624.27 |
| 2016/0017991 | A1 | 1/2016 | Boban et al. | |
| 2016/0109889 | A1 * | 4/2016 | Grill | G05D 16/2024 137/538 |
| 2016/0195879 | A1 | 7/2016 | Bruck et al. | |

FOREIGN PATENT DOCUMENTS

| | | |
|---|---|---|
| DE | 10 2013 002 794 | 8/2014 |
| DE | 10 2013 014 452 | 3/2015 |
| EP | 1 741 936 | 1/2007 |
| EP | 2 960 561 | 12/2015 |
| WO | 2015/028108 | 3/2015 |

* cited by examiner

VALVE, IN PARTICULAR A 4/2-WAY SLIDE VALVE

FIELD OF THE INVENTION

The invention relates to a valve, in particular a 4/2-way slide valve, having a longitudinally movable, guided valve piston in a valve housing for selectively connecting and disconnecting fluid ports in the valve housing, such as a pressure supply port, a reservoir port and two utility ports, and having an energizable magnetic system for actuating the valve piston.

BACKGROUND OF THE INVENTION

Valves of this type are state of the art and are used in a wide variety of systems for controlling fluid media. DE 42 27 767 A1 discloses a 4/2-way valve of the aforementioned type for controlling the regeneration system of a filter system for drinking water by way of an example. In particular, 4/2 directional control valves are also used in hydraulic systems, for example, for the supply of actuators, such as working cylinders. If working cylinders controlled via directional control valves are used in working equipment, such as construction machinery, excavators, wheel loaders or the like, as actuators for lifting or gripping functions, particularly high demands are placed on the operational reliability. A typical usage of working cylinders in construction machinery is, for example, a tool change, for example, by picking up an excavator bucket, where a locking operation for coupling a working arm to the excavator bucket has to be performed. A lock-out system is driven by a hydraulic cylinder for interlock with the tool in question. To avoid damage in the event that extending locking bolts do not retract into the bolt holders in the event of incorrect positioning, but collide with the tool to be picked up, it has to be ensured that the locking bolts do not extend under the full pressure of the hydraulic system of the relevant machine. At a working pressure is to be used, which working pressure does not damage the tool in the event of a collision, while the respective bolts are retracted at the normal system pressure. This operation entails a pressure reducing valve and a check valve forming a bypass to the lock-out system hydraulic cylinder installed downstream of the 4/2-way slide valve, resulting in increased space requirements and cost for the safe control of the working cylinder.

SUMMARY OF THE INVENTION

Based on this prior art, the invention addresses the problem of providing an improved valve enabling the reliable control of a working cylinder provided for coupling processes at comparatively reduced effort and expenditure.

According to the invention, this object is basically achieved by a valve having, as a significant feature of the invention, in the de-energized state of the magnet system, a control device arranged in the valve housing can be used to set, in particular limit, the control pressure at one of the utility ports. In this way, a valve unit fulfills both the travel control and the pressure reducing function required for operational safety. The control effort is reduced, both in terms of space requirements and in terms of cost expenditure.

With particular advantage in the valve according to the invention, the control device passes the fluid pressure present at one utility port on to a control pressure chamber for the purpose of actuating a pressure-detecting piston in operative connection with the valve piston. This passing of the fluid pressure permits traversing movements of the valve piston to control the fluid flow between the pressure-supply port and this one utility port against the action of an energy storage, such as a compression spring.

In this case, the arrangement can be made with particular advantage such that the pressure-detecting piston passes in a movable manner through a guide stationarily arranged in the valve housing. One free end of the pressure-detecting piston is in contact with the valve piston in any travel state of the piston. The other end of the pressure-detecting piston is in contact with an actuating rod of the magnet armature of the magnet system. The valve then forms a continuous coaxial unit from the magnetic system to the end of the valve housing. In this case, the control pressure chamber of variable volume may be encompassed by the valve housing and delimited by the guide and the valve piston.

To pressurize the pressure-detecting piston with the fluid pressure present at the one utility port, the control pressure chamber can be permanently connected in a fluid-conducting manner to that utility port. Fluid pressure of that utility port is signaled to the control pressure chamber via a diaphragm or throttle and a recess in the valve piston.

For the control of the relevant, working cylinder to be supplied, the arrangement may advantageously be made such that in the energized state of the magnet system, the valve piston assumes a position within the valve housing, where the pressure in the pressure-supply port matches the pressure at the other user port, i.e. the working cylinder is subjected to the full system pressure in the energized state.

For an advantageous embodiment of the valve in the form of a valve cartridge adjoining the magnet system, the valve piston can be provided with fluid guides on the outer periphery arranged concentrically to the piston's travel axis. Depending on the position of the valve piston, at least one connection from the pressure-supply port to the relevant utility port and from the relevant utility port to the reservoir port are permitted.

The energy storage formed as a compression spring preferably acts on that side of the armature facing away from the valve piston.

For the formation of the valve housing in the manner of a valve cartridge, the arrangement is preferably made such that the one utility port to be controlled by the fluid flow for a de-energized magnet system enters the valve housing from the front. The other ports are guided radially in the valve housing.

The subject of the invention is also a fastening device having at least one controllable hydraulic cylinder, whose piston rod unit separates two working spaces from each other. These working spaces are each connected to a utility port of a valve according to the invention. The fastening device is characterized in that the control device of the valve responds and outputs a mechanically adjustable, limited control pressure for actuating the piston-rod unit upon the extension of the piston-rod unit and its collision with a third component, such as an excavator bucket.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
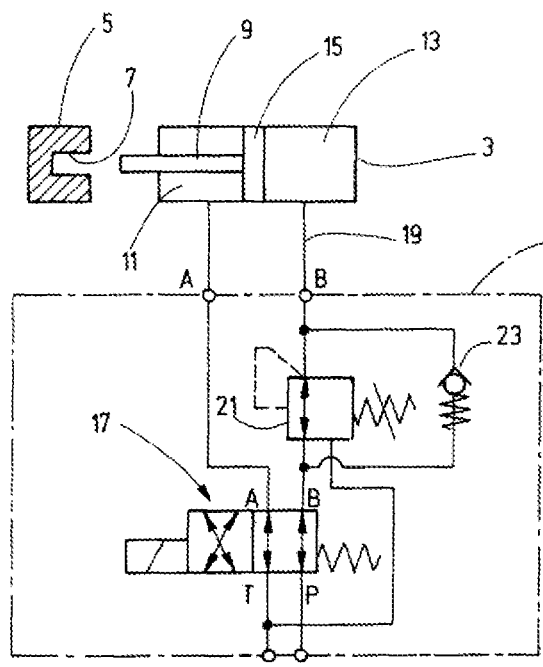
FIG. 1 is a schematic diagram of the circuit of a valve device having a 4/2-way slide valve according to the prior art for controlling the working cylinder of a highly schematically shown fastening device.

In FIG. 1 a valve assembly 1 is provided for actuating a working cylinder 3, which forms the actuator for a fastening device, with a bolt holder 5 shown in a schematically, greatly simplified representation. The fastening device in the present example is a quick-coupler device used in construction machines such as excavators, wheel loaders 5 and the like to install or disconnect a work tool, such as a bucket in the course of a tool change. In these devices, hydraulically extendable locking bolts engage with sleeves 7 in the bolt holder 5 for establishing a coupling connection. The locking bolts are formed directly by the piston rod 9 of the respective working cylinder 3 itself or by a member mechanically connected to the piston rod 9. The relevant working cylinder 3 is designed as a double-acting cylinder having a working chamber at the rod side 11 and a working chamber at the piston side 13. The piston side working chamber is connected to a utility port B of valve assembly 1. The working chamber at the rod side 11 is connected to a utility port A of the valve assembly 1. For the unlocking process, the working chamber at the rod side 11 can be supplied with pressurized fluid via the utility port A. The working chamber at the piston side 13 can be supplied with pressurized fluid for the coupling process via the utility port B to extend the working piston 15 and the piston rod 9 for the coupling engagement. The ports P and T of the valve assembly 1 are connected to the hydraulic system of the associated construction machinery for this pressure supply. The system pressure of the hydraulic system is present at the port P. Port T is connected to the reservoir or tank.

The valve assembly 1 has an electromagnetically actuated 4/2-way slide valve 17 for the optional connection of the pressure-supply port P and the reservoir port T to the working chambers 11 and 13 of the working cylinder 3. The working chamber 11 for the retraction motion of the piston 15 for the unlocking motion of the piston rod 9 and the locking bolt is supplied with full system pressure, by switching the 4/2-way slide valve 17 from the valve position shown in FIG. 1. The working chamber at the piston side 13 has to be supplied with reduced operating pressure for the extension of the piston 15 and the respective locking bolt to avoid mechanical damage to the respective locking bolt and/or the bolt holder 5 in the event of a collision. The valve assembly 1 therefore has a pressure-reducing valve 21 between the 4/2-way slide valve 17 and the working chamber at the side of the piston 13, which pressure-reducing valve is set to a pressure producing a reduced piston force, which is harmless in the event of a collision. To allow the volume displaced from the working chamber at the side of the piston 13 to flow to the reservoir substantially without pressure while the piston 15 retracts, a bypass of the pressure-reducing valve 21 is required, which is formed by an additional check valve 23.

Figure 2:
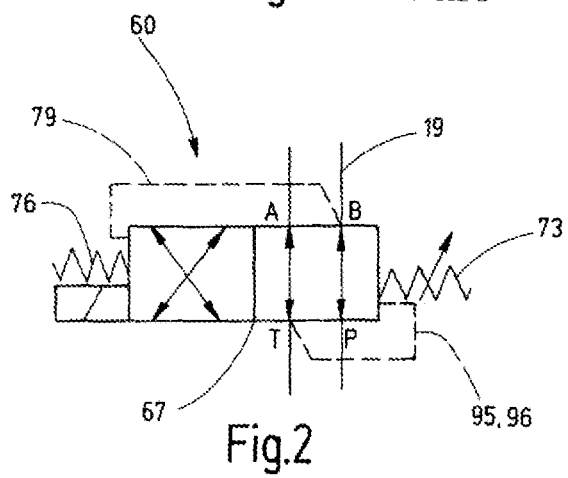
FIG. 2 is a schematic diagram of the valve according to an exemplary embodiment of the invention.
Figure 7:
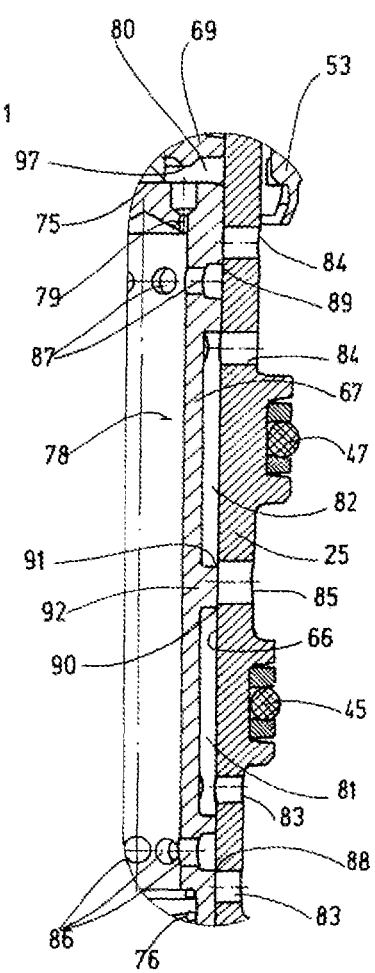
FIG. 7 is a partial side view in section of the valve housing of the valve of FIG. 3 in the operating state shown in FIG. 5.

The valve 60 according to the invention, the schematic representation of which is shown in FIG. 2, comprises the overall functions of the valve assembly 1, i.e. both the switching function of the 4/2-way slide valve 17 and the pressure-reducing function of the pressure reducing valve 21. The additional check valve 23 of the valve assembly 1 is also omitted. The more detailed design details of the valve according to the invention 60 are shown in FIGS. 3 to 7 and described below.

Figure 3:
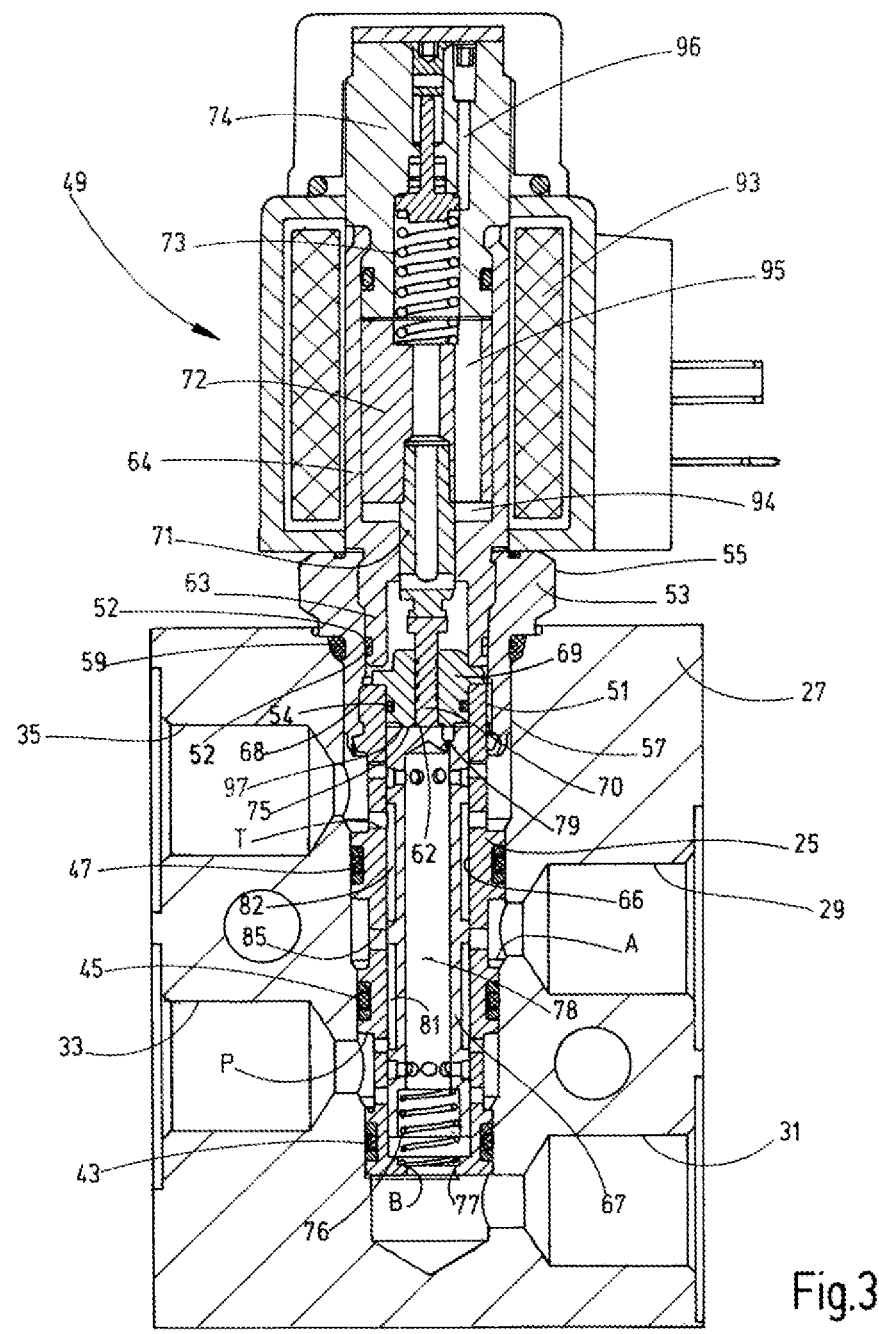
FIG. 3 is a side view in section of a valve according to an exemplary embodiment of the invention, inserted into a valve block, in an operating state corresponding to the energized magnet system is shown.
Figure 4:
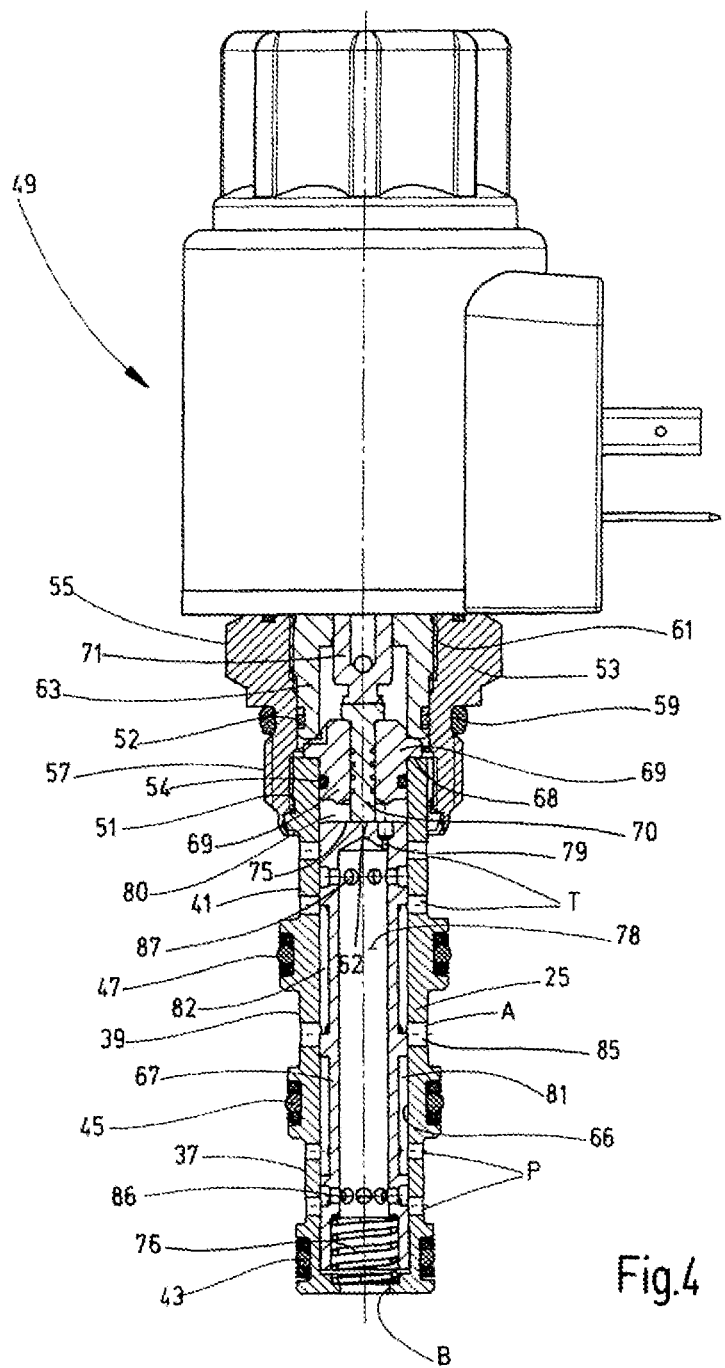
FIGS. 4 to 6 are side views in section of the valve of FIG. 3 in which the magnet system and the valve housing are shown, without associated valve block in a longitudinal section, illustrating different operating states of the valve.
Figure 5:
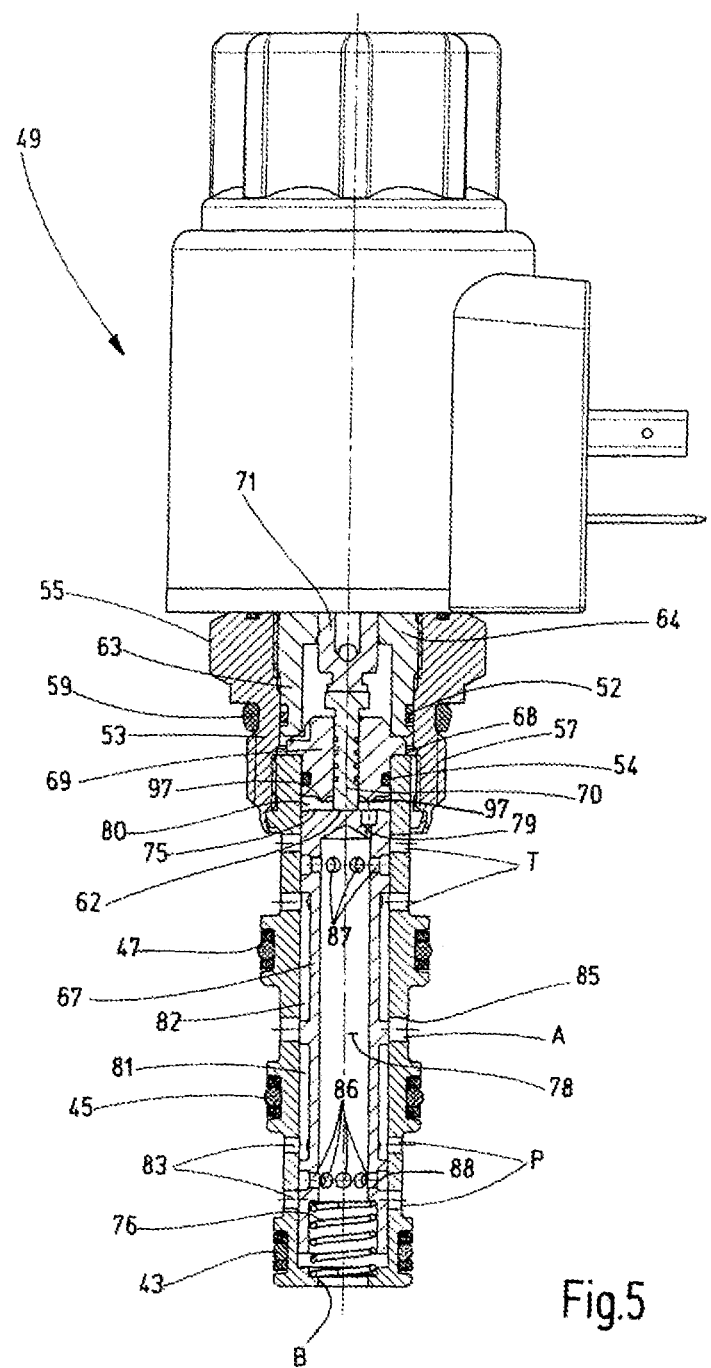

As shown, the exemplary embodiment has a valve housing 25, which can be installed in the manner of a valve cartridge in a valve block 27, shown only in FIG. 3. Valve block 27 has the connection points 29 and 31 for the utility ports A and B, respectively, and the connection points 33 and 35 for the pressure-supply port P or the reservoir port T, respectively. As most clearly shown in FIGS. 4 to 7, the outer periphery of the valve housing 25 is stepped, so that, starting from the end at the bottom in the figures, sections having a reduced diameter 37, 39 and 41 are formed, which are sealed against the valve block 27 by the sealing means or seals 43, 45 and 47 located at the non-recessed peripheral sections. For installation in the valve block 27, the valve housing 25 has, at the end facing towards a magnet system 49 provided for actuation, an external thread 51, to which a screw-in body 53 can be screwed or threaded. Body 53 has the form of a hollow screw with an external hexagon 55 and has an external thread 57 on the side facing away from the magnet system 49. This external thread is used to screw body 53 into the valve block 27. A sealing ring 59 forms the seal at a step of the screw 53. On the side facing the magnet system 49, the screw-in body 53 has an internal thread 61, into which the end section 63 of the pole tube 64 (FIG. 3) of the magnet system 49 is screwed. A sealing ring 52 forms the seal.

The valve housing 25 has a circular cylindrical piston guide 66 for a valve piston 67 on the inside provide by the inside surface of valve housing 25. In the state shown in the figures, in which the screw-in body 53 is used to screw the valve housing 25 to the pole tube 64 of the magnet system, a guide body 69 is mounted between the end 68 of the valve housing 25 and the end section 63 of the pole tube 64. The guide body forms a coaxial passage as displacement guide for a pressure-detecting piston 70. The end of pressure-detecting piston 70 facing the magnet system 49 abuts the end of an actuating rod 71 of the armature 72 (FIG. 3).

The armature 72, the actuating rod 71 and the pressure-detecting piston 70 are pre-tensioned for motion in the direction of the valve piston 67 of a compression spring 73. Spring 73 is supported on a one end by the armature 72 on the side facing away from the actuating rod 71 and on the other end by the pole core 74 (FIG. 3) of the magnet system 49. A contact spring 76 is used to keep the piston end 75 of the valve piston facing the pressure-detecting piston 70 permanently in contact with the pressure-detecting piston 70. Spring rests against a collar 77 formed at the free end of the valve housing, which collar delimits a central, end opening of the valve housing 25 and forms the utility port B there. As shown in FIG. 3, collar 77 is connected to the connection point 31. The valve piston 67 has a coaxial inner cavity 78, which extends from the open end of the utility port B to just before the piston end 75 abutting the pressure-detecting piston 70 where the valve piston 67 is closed except for a passage having a restriction 79. This restriction 79 connects the utility port B to a control pressure chamber 80, which is formed between the piston end 75 and the guide body 69. As a result, the fluid pressure of the control pressure chamber 80 is effective at the control pressure chamber 80 facing the piston surface 62 of the pressure-detecting piston 70.

The valve piston 67 is provided, in the manner usual for 4/2-way slide valves. On the outer periphery, valve piston has direction fluid guides 81 and 82 extending concentrically to the axis of travel in the axial direction of its longitudinal axis, and can be used, depending on the control position of the valve piston 67, to establish connections between the pressure-supply port P and utility port A or B and between the reservoir port T and the utility port A or B. For these connections, openings 83 for the pressure-supply port P, openings 84 for the reservoir port T and openings 85 for the utility port A are formed in the wall of the valve housing 25 as only numbered in FIG. 7. As can also best be seen in FIG. 7, the non-recessed peripheral sections of the valve piston 67, which delimit the fluid guides 81 and 82, form control edges which control the fluid passage at the openings 83, 84 and 85 because the fluid guides 81, 82 are without holes between the non-recessed peripheral sections to prevent fluid communication between the interior cavity of the valve piston 67 and the fluid guides. Those holes, if present, would provide unwanted fluid communication between the interior cavity of the valve piston 67 and the fluid guides of the valve piston. The control edge 88 is present at the drilled hole 83, which leads to the pressure-supply port P. The control edge 89 is disposed at the edge of the drilled hole 84, which leads to the reservoir port T. The edges 90 and 91 at the edge of the non-recessed area 92 control the passage at the openings 85 of the utility port A.

Figure 6:
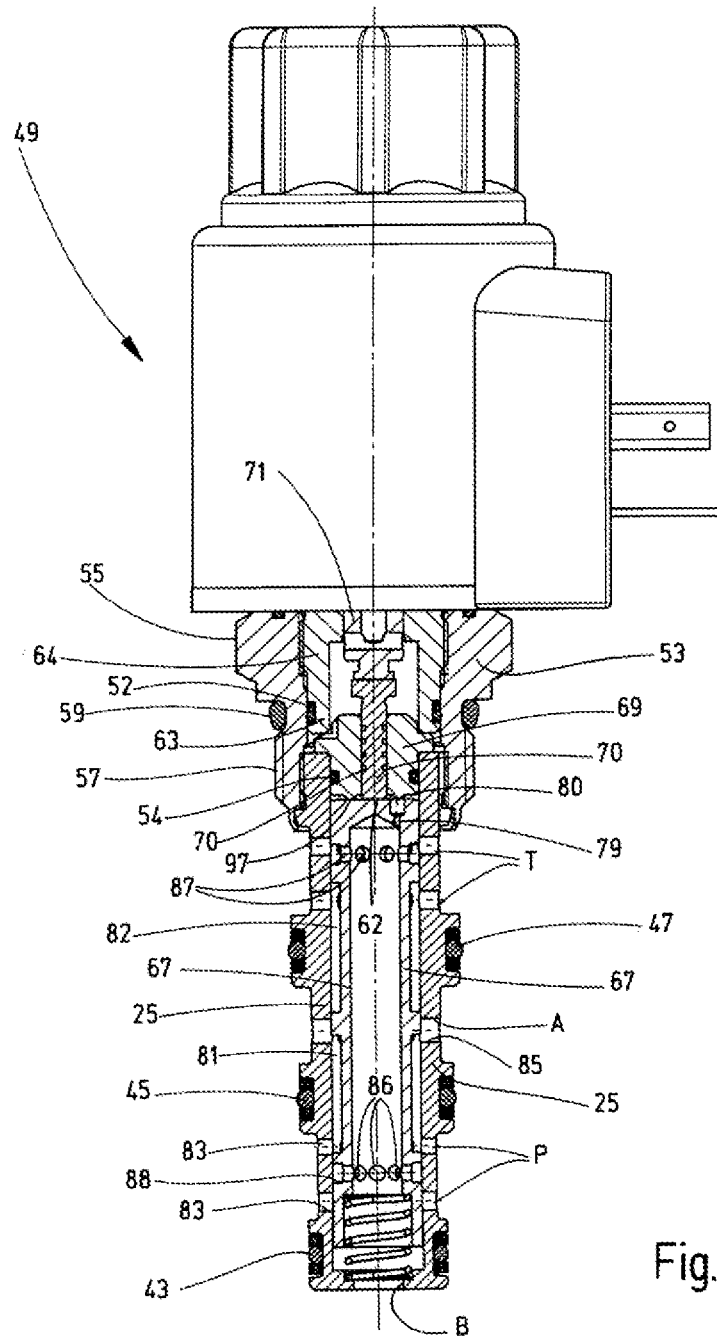

FIGS. 3 and 6 show an operating state in which the magnet system 49 designed as a "pulling magnet" is energized by supplying its winding 93. In the armature chamber 94, which is vented to the environment in the usual manner via the passages 95 and 96 in the armature 72 or in the pole core 74, the armature 72 has moved against the action of the compression spring 73. As the piston end 75 of the valve piston 67 abuts against the piston surface 62 of the pressure-detecting piston 70 under the action of the contact spring 76, it has moved upwards in the figures into the position shown in FIGS. 3 and 6 in conjunction with the actuating rod 71 of the armature 72. In this position, the control pressure chamber 80 has the smallest volume corresponding to the size of a gap that is formed by an annular rib 97 between the end 75 of the valve piston 67 and the guide body 69, which rib protrudes from the guide body 69 coaxially to the pressure-detecting piston 70. This position of the valve piston 67 assumed when the magnet system 49 is energized, causes unlocking, as the openings 83 of the pressure-supply port P at the valve housing 25 are connected to the opening 85 of the pressure-supply port A via the fluid guide 81, while simultaneously the utility port B is connected to the openings 84 of the reservoir port T via the drilled holes 87 such that the volume displaced from the working chamber 13 of the working cylinder 3 during the unlocking process flows to the reservoir.

The energization of the winding 93 is interrupted for a locking operation. For this purpose, the compression spring 73 displaces the armature 72 and via its actuating rod 71 the pressure-detecting piston 70 to the position shown in FIG. 4, wherein the valve piston 67 then displaced now connects the openings 83 of the pressure supply port P at the valve housing 25 to the utility port B via the drilled holes 86 in the valve piston 67, while the openings 85 of the utility port A are connected to the openings 84 of the reservoir port T via the fluid guide 82, such that the working piston 15 moves to extend the piston rod 9 and the volume from the working chamber 11 of the working cylinder is displaced towards the reservoir T. Simultaneously, the pressure in the cavity 78 of the valve piston 76 of the utility port B starts acting in the control pressure chamber 80 via the passage having the restriction 79 and pressurizes the effective piston surface 62 of the pressure-detecting piston 70. At a pressure level that can be set mechanically by the design of the compression spring 73 and the contact spring 76 and adjusted by the size of the effective piston surface 62 of the pressure-detecting piston 70, the pressure-detecting piston 70 moves against the force of the compression spring 73. The valve piston 67, which follows this movement due to the action of the application spring 76, is moved from the position shown in FIG. 4 to a control position corresponding to the balance of the spring forces and the piston force of the pressure-detecting piston 70, cf. FIGS. 5 and 7, in which control position the position of the control edge 88 of the valve piston 67 at the openings 86 of the pressure-supply port P controls the pressure effecting the extension movement of the piston 15 at the utility port B to a desired safe value. The valve 60 according to the invention in that way fulfills not only the switching functions for the unlocking and locking operations by energizing and de-energizing the winding 93 of the magnet system 49, but also fulfills a pressure control function, eliminating the pressure-reducing valve 21 with the check valve 23 provided in the prior art.

While one embodiment has been chosen to illustrate the invention, it will be understood by those skilled in the art that various changes and modifications can be made therein without departing from the scope of the invention as defined in the claims.

The invention claimed is:

1. A valve, comprising:
    a valve housing having a pressure supply port, a reservoir port and first and second utility ports;
    a valve piston movably guided along a longitudinal axis of said valve housing selectively connecting said first and second utility ports to said pressure supply port and said reservoir port based on control positions of said valve piston in said valve housing, said valve piston having an outer periphery;
    an energizable magnet system actuatingly coupled to and actuating said valve piston for movement in said valve housing;
    a control being arranged in said valve housing, being settable at a pressure limit and controlling pressure at one of said first and second utility ports in a de-energized state of said energizable magnet; and
    first and second fluid guide recesses being on said outer periphery of said valve piston without having holes therein so as to prevent fluid communication between an interior cavity of said valve piston and the first and second fluid guide recesses, being concentric to said longitudinal axis and being separated from each other by a middle non-recessed section of said valve piston, said middle non-recessed section having opposing first and second edges facing said first and second flow guide recesses, respectively, controlling fluid flow through an opening in said valve housing connected in fluid communication with said first utility port.

2. A valve according to claim 1 wherein
said valve piston comprises first and second and non-recessed sections being on said outer periphery of said valve piston at ends of first and second fluid guide recesses, respectively, remote from said middle non-recessed section and being concentric to said longitudinal axis, said first end non-recessed section having opposing inner and outer edges controlling fluid flow through openings in said valve housing connected in fluid communication with said pressure supply port, said second end non-recessed section having opposing inner and outer edges controlling fluid flow through openings in said valve housing connected in fluid communication with said reservoir port, said outer edges of said first and second non-recessed sections being defined by holes in said first and second end non-recessed sections.

3. A valve according to claim 2 wherein
each of said first and second fluid guide recesses has a bottom surface in a common cylinder parallel to said longitudinal axis on said outer periphery of said valve piston and continuously encompasses said valve piston on said outer periphery; and
said middle and end non-recessed sections have radially outer surfaces in a common cylinder extending parallel to said common cylinder of said bottom surfaces of said first and second fluid guide recesses.

4. A valve according to claim 2 wherein
each of said holes in the respective first and second end non-recessed sections comprises a plurality of drilled holes being in a row arranged radially to said longitudinal axis, abutting a displacement position of said valve piston between respective rows of openings on said valve housing and opening into an inner wall of said valve piston.

5. A valve according to claim 1 wherein
in each of said control positions of said valve piston, a permanent fluid communication connection is provided between said pressure supply port and said first fluid guide recess via a first opening in said valve housing, said first opening being spaced along said longitudinal axis from a second opening in said valve housing in fluid communication with said pressure supply port, said first and second openings being separated by a web-shaped non-recessed section on said valve piston in each of said control positions.

6. A valve according to claim 1 wherein
in each of said control positions of said valve piston, at least a partial permanent fluid connection is provided between said second fluid guide recess and said reservoir port via a first opening in said valve housing, said first opening being spaced along said longitudinal axis from a second opening in said valve housing in fluid communication with said reservoir port, said first and second openings being separated by a web-shaped non-recessed section of said valve piston in each of said control positions.

7. A valve according to claim 1 wherein
said first fluid guide recess has an axial length along said longitudinal axis smaller than an axial length along said longitudinal axis of said second fluid guide recess.

8. A valve according to claim 1 wherein
each of said first and second fluid guide recesses has a bottom surface in a common cylinder parallel to said longitudinal axis on said outer periphery of said valve piston and continuously encompasses said valve piston on said outer periphery.

9. A valve according to claim 1 wherein
each of said pressure supply port and said reservoir port comprises a pair of openings in said valve housing spaced along said longitudinal axis.

10. A valve according to claim 1 wherein
said control passes fluid pressure on said second utility port to a control pressure chamber, said control actuating a pressure-detecting piston operatively connected to said valve piston permitting transversing movement of said valve piston in a manner controlling fluid flow between said pressure supply port and said second utility port against a force of a compression spring.

11. A valve according to claim 10 wherein
said compression spring acts on an end of an armature of said energizable magnet facing away from said valve piston.

12. A valve according to claim 10 wherein
said pressure detecting piston is movable in a guide stationarily arranged in said valve housing, one free end of said pressure-detecting piston being in contact with said valve piston in all of said control positions of said valve piston in said valve housing, an opposite end of said pressure detecting position contacting an actuating rod connected to a magnet armature of said energizable magnet.

13. A valve according to claim 12 wherein
said control pressure chamber is encompassed by said valve housing and is delimited by said guide and said valve piston.

14. A valve according to claim 13 wherein
said control pressure chamber is permanently connected in fluid communication via a diaphragm or a throttle and via a recess in said valve piston to said second utility port, said fluid pressure on said second utility port being signaled to said control pressure chamber.

15. A valve according to claim 1 wherein
said valve piston is in a position in said valve housing in an energized state of said energizable magnet such that pressure at said pressure supply port matches pressure at said first utility port.

16. A valve according to claim 1 wherein
said second utility port is controlled by fluid flow in said valve housing when the energizable magnet is de-energized and extends through an axial end of said valve housing, said pressure supply port, said reservoir port and said first utility port extend through a radial side of said valve housing.

17. A valve according to claim 1 wherein
each of said first and second fluid guide recesses are groove-shaped.

18. A valve according to claim 1 wherein
said first and second utility ports are connected in fluid communication to separate first and second working chambers, respectively, of a controllable hydraulic cylinder, said first and second working chambers being separated by a cylinder piston connected to a piston rod, said piston rod being connected to a mechanically adjustable component controlled by fluid pressure at said first and second utility ports.

19. A valve, comprising:
a valve housing having a pressure supply port, a reservoir port and first and second utility ports;
a valve piston movably guided along a longitudinal axis of said valve housing selectively connecting said first and second utility ports to said pressure supply port and said reservoir port based on control positions of said valve piston in said valve housing, said valve piston having an outer periphery;

an energizable magnet system actuatingly coupled to and actuating said valve piston for movement in said valve housing;

a control being arranged in said valve housing, being settable at a pressure limit and controlling pressure at one of said first and second utility ports in a de-energized state of said energizable magnet; and in each of said control positions of said valve piston, a permanent fluid communication connection being provided between said pressure supply port and a fluid guide recess in said valve piston via a first opening in said valve housing, said first opening being spaced along said longitudinal axis from a second opening in said valve housing in fluid communication with said pressure supply port, said first and second openings being separated by a web-shaped non-recessed section on said valve piston in each of said control positions.

20. A valve, comprising:

a valve housing having a pressure supply port, a reservoir port and first and second utility ports;

a valve piston movably guided along a longitudinal axis of said valve housing selectively connecting said first and second utility ports to said pressure supply port and said reservoir port based on control positions of said valve piston in said valve housing, said valve piston having an outer periphery;

an energizable magnet system actuatingly coupled to and actuating said valve piston for movement in said valve housing;

a control being arranged in said valve housing, being settable at a pressure limit and controlling pressure at one of said first and second utility ports in a de-energized state of said energizable magnet;

first and second fluid guide recesses being on said outer periphery of said valve piston; and in each of said control positions of said valve piston, at least a partial permanent fluid connection being provided between said second fluid guide recess and said reservoir port via a first opening in said valve housing, said first opening being spaced along said longitudinal axis from a second opening in said valve housing in fluid communication with said reservoir port, said first and second openings being separated by a web-shaped non-recessed section of said valve piston in each of said control positions.

21. A valve, comprising:

a valve housing having a pressure supply port, a reservoir port and first and second utility ports;

a valve piston movably guided along a longitudinal axis of said valve housing selectively connecting said first and second utility ports to said pressure supply port and said reservoir port based on control positions of said valve piston in said valve housing, said valve piston having an outer periphery;

an energizable magnet system actuatingly coupled to and actuating said valve piston for movement in said valve housing;

a control being arranged in said valve housing, being settable at a pressure limit and controlling pressure at one of said first and second utility ports in a de-energized state of said energizable magnet; and each of said pressure supply port and said reservoir port having a pair of openings in said valve housing spaced along said longitudinal axis.

* * * * *